US010309546B2

(12) United States Patent
Harada et al.

(10) Patent No.: US 10,309,546 B2
(45) Date of Patent: Jun. 4, 2019

(54) ELECTRICALLY OPERATED VALVE

(71) Applicant: FUJIKOKI CORPORATION, Tokyo (JP)

(72) Inventors: Takao Harada, Tokyo (JP); Kensuke Tabuchi, Tokyo (JP); Takenori Nobuki, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 338 days.

(21) Appl. No.: 14/645,601

(22) Filed: Mar. 12, 2015

(65) Prior Publication Data
US 2015/0276082 A1 Oct. 1, 2015

(30) Foreign Application Priority Data

Mar. 27, 2014 (JP) ................................ 2014-066271

(51) Int. Cl.
F16K 31/02 (2006.01)
F25B 41/06 (2006.01)
F16K 47/02 (2006.01)

(52) U.S. Cl.
CPC .............. F16K 31/02 (2013.01); F16K 47/02 (2013.01); F25B 41/062 (2013.01);
(Continued)

(58) Field of Classification Search
CPC ......... F16K 31/02; F16K 47/02; Y02B 30/72; Y10T 137/86759; F25B 41/062;
(Continued)

(56) References Cited

U.S. PATENT DOCUMENTS 2,887,129 A * 5/1959 Stear .................. G05D 7/03
138/43
3,448,733 A * 6/1969 Aske .................. F02P 19/00
123/179.13
3,693,659 A * 9/1972 Parola .................. F16K 3/22
137/625.3

(Continued)

FOREIGN PATENT DOCUMENTS

EP 2006617 A2 12/2008
EP 2034259 A1 3/2009
(Continued)

OTHER PUBLICATIONS

Extended European Search Report in corresponding European Application No. 15159149.2, dated Jul. 29, 2015.

Primary Examiner — Matthew W Jellett
Assistant Examiner — Christopher D Ballman
(74) Attorney, Agent, or Firm — Bacon & Thomas, PLLC

(57) ABSTRACT

An electrically operated valve is provided with a valve main body in which a valve chamber is defined in an inner portion and a first opening and a second opening are formed in a side portion and a bottom portion, a valve seat member which has an valve port open to the valve chamber and a valve seat and is provided in the second opening of the valve main body, a valve body which is arranged in the valve chamber so as to be movable up and down, and an elevation drive portion which moves up and down the valve body in relation to the valve seat, and a porous body constructed by a foam metal is arranged along a portion which is positioned in a side portion of the valve port on the inner wall surface of the valve main body. Accordingly, an abnormal noise can be reduced.

7 Claims, 5 Drawing Sheets

(52) U.S. Cl.
CPC . *F25B 2341/061* (2013.01); *F25B 2341/0653* (2013.01); *F25B 2500/12* (2013.01); *Y02B 30/72* (2013.01); *Y10T 137/86759* (2015.04)

(58) Field of Classification Search
CPC ............ F25B 2341/061; F25B 2500/12; F25B 2341/0653
USPC .................................................... 137/625.33
See application file for complete search history.

(56) References Cited

U.S. PATENT DOCUMENTS

| | | | | |
|---|---|---|---|---|
| 4,083,380 A * | 4/1978 | Huber | ....................... | F16K 3/26 137/505.25 |
| 4,102,357 A * | 7/1978 | Charlton | ............ | B60H 1/00485 137/625.32 |
| 4,103,702 A * | 8/1978 | Duthion | ................... | F16K 3/26 137/375 |
| 4,523,436 A * | 6/1985 | Schedel | ................ | F25B 41/062 251/129.11 |
| 5,006,235 A * | 4/1991 | Cooper | ................ | B01D 29/232 210/136 |
| 5,261,453 A * | 11/1993 | Hekkert | .................. | F16K 47/02 137/614.18 |
| 6,105,614 A * | 8/2000 | Bohaychuk | .............. | F16K 47/08 137/625.3 |
| 7,284,569 B2 * | 10/2007 | Takemaru | .......... | B01D 46/2403 137/545 |
| 7,426,938 B2 * | 9/2008 | Bohaychuk | .............. | E21B 34/02 137/625.33 |
| 2005/0218361 A1 * | 10/2005 | Shajii | .................. | F16K 31/0665 251/129.04 |
| 2009/0019871 A1 * | 1/2009 | Yukimoto | ............. | F25B 41/062 62/222 |
| 2009/0183520 A1 * | 7/2009 | Yukimoto | ............. | F25B 41/062 62/222 |

FOREIGN PATENT DOCUMENTS

| | | |
|---|---|---|
| JP | 2001-050616 A | 2/2001 |
| JP | 2002-235969 A | 8/2002 |
| JP | 2013-130271 A | 7/2013 |

\* cited by examiner

ELECTRICALLY OPERATED VALVE

BACKGROUND OF THE INVENTION

Field of the Invention

The present invention is involved with an electrically operated valve, and relates to an electrically operated valve, for example, used in a heat pump type heating and cooling system.

Description of the Conventional Art

Conventionally, there has been advanced development of an electrically operated valve which aims at downsizing, achieving great capacity and saving energy. As one example of the conventional electrically operated valve as mentioned above, patent document 1 discloses a technique which can use a valve opening spring having a smaller spring load by making force acting in a valve closing direction as small as possible.

The electrically operated valve disclosed in the patent document 1 is provided with a valve main body having a valve chamber, a first inlet and outlet which is open to the valve chamber and is transversely situated, a valve port with valve seat which is open to the valve chamber and is vertically situated, and a second inlet and outlet which is communicated with the valve port, a valve body which is arranged in the valve chamber in an up-and-down movable manner so as to open and close the valve port, an elevation drive means which has an electric motor for moving up and down the valve body, and a valve opening spring which energizes the valve body in a valve opening direction, a bore diameter of the valve port is set to be approximately identical to a chamber diameter of a back pressure chamber which is defined above the valve body, a pressure equalizing passage is provided within the valve body, the pressure equalizing passage having an opening lower end surface so as to communicate the valve port with the back pressure chamber, and dimensions of the respective portions are set so that a value obtained by dividing a lower end opening area of the pressure equalizing passage by an area of the valve port is within a predetermined range.

In this kind of electrically operated valve, a fluid (a refrigerant) is flowed in two directions including a first flowing direction in which the refrigerant heads for the second inlet and outlet from the first inlet and outlet, and a second flowing direction in which the refrigerant heads for the first inlet and outlet from the second inlet and outlet, however, for example, in the case that a refrigerant (a gas refrigerant) constructed by gas is flowed in the first flowing direction in an excessive gas state, there has been a problem that a periodic eddy flow is generated in the vicinity of an area between right and left portions of the valve port and an inner wall surface of the valve main body in the case that the valve chamber is seen from the first inlet and outlet side, and an abnormal noise is generated with the periodic eddy flow. Further, for example, in the case that the gas refrigerant is flowed in the second flowing direction in the excessive gas state, there has been a problem that the periodic eddy flow is generated in the vicinity of an area between a portion in an opposite side to the first inlet and outlet in the valve port and the inner wall surface of the valve main body, and the abnormal noise is generated with the periodic eddy flow (refer to FIG. 7). Specifically, for example, in the case that the gas refrigerant is flowed in the first flowing direction in the excessive gas state, the periodic eddy flow mentioned above is generated at a high differential pressure and an extremely small valve opening degree. This matter has been confirmed by experiments executed by the inventors of the present invention (refer to FIG. 8).

There has been conventionally fear that the abnormal noise at the using time as mentioned above has been generated in various valve devices, and patent documents 2 and 3 disclose prior arts which inhibit the abnormal noise from being generated in an expansion valve and a dry valve which are used in a refrigeration cycle.

The expansion valve disclosed in the patent document 2 is an expansion valve having a main body which is provided with an opening in a side surface and a lower surface and has a space in an inner portion, a valve body and a valve seat which form a throttle portion in the inner portion of the main body, a shaft which is connected to the valve body and has a rotor in an upper portion, a case which surrounds the shaft and the rotor, a stator which is positioned in an outer periphery of the rotor, a supporting means which supports the main body and the shaft, a first pipe which is connected to the opening in the side surface of the main body and a second pipe which is connected to the opening of the lower surface of the main body, wherein the expansion valve is provided with a rectifying means which is positioned in the inner portion of the main body, has one end fixed to the main body and the other end fixed to the supporting means, has a plurality of through holes in a side surface and is formed into a hollow shape.

Further, the dry-type valve disclosed in the patent document 3 is provided in a peripheral side of a valve seat with a passage which communicates a valve chamber and a valve outlet in a valve closing state, a throttle constructed by a porous body is arranged in the passage, an elastic body coming into contact with the porous body in the valve closing state is provided in a valve rod side of the dry valve, the elastic body is functioned as a valve body, and the porous body is functioned as the valve seat.

PRIOR ART DOCUMENT

Patent Documents

Patent Document 1: Japanese Unexamined Patent Publication No. 2013-130271
Patent Document 2: Japanese Unexamined Patent Publication No. 9-310939
Patent Document 3: Japanese Unexamined Patent Publication No. 2002-235969

SUMMARY OF THE INVENTION

Problem to be Solved by the Invention

However, in the prior art disclosed in the patent document 2, the refrigerant flowing into from the first pipe comes around the space which is formed by the main body and the rectifying means, flows into the space having the valve body from a plurality of through holes which are formed in the rectifying means, and flows to the second pipe after passing through a throttle portion which is formed by the valve body and the valve seat. As a result, there can be generated a problem that a flow rate loss of the refrigerant is enlarged and a problem that an arrangement and a construction of the rectifying means are complicated, in spite that noise can be reduced by suppressing vibration of the valve body and the case due to the fluctuation of the pressure which is caused by an uneven state of the refrigerant.

Further, in the prior art disclosed in the patent document 3, the refrigerant is rectified when the refrigerant passes through the porous body, and an air-liquid two-phase flow is uniformized and is depressurized in the uniformized state even in the case that the air-liquid two-phase flow having the most significant refrigerant flow sound flows into. As a result, there can be generated a problem that a flow rate loss of the refrigerant is enlarged and a problem that it is necessary to make the porous body serve as the valve seat, in spite that the discontinuous sound is reduced and a sound deadening effect can be obtained.

The present invention is made by taking the problems mentioned above into consideration, and an object of the present invention is to provide an electrically operated valve which can reduce an abnormal noise generated in the case that a fluid is flows in a first flowing direction and a second flowing direction, while suppressing a flow rate loss of a fluid with a simple structure.

Means for Solving the Problem

As a result of devoting themselves to make a study, the inventors of the present invention have found that it is possible to effectively reduce an abnormal noise which is generated in the case that a fluid is flowed in a first flowing direction and a second flowing direction in an electrically operated valve, by arranging an eddy flow generation preventing means constructed by a porous body along an appropriate portion in an inner wall surface of a valve main body.

More specifically, in order to solve the problems mentioned above, the electrically operated valve according to the present invention is an electrically operated valve comprising a valve main body in which a valve chamber is defined in an inner portion and a first opening and a second opening are formed in a side portion and a bottom portion, a valve seat member which has an valve port open to the valve chamber and a valve seat and is provided in the second opening of the valve main body, a valve body which is arranged in the valve chamber so as to be movable up and down, and an elevation drive portion which moves up and down the valve body in relation to the valve seat, wherein a porous body is arranged along a portion which is positioned in a side portion of the valve port on the inner wall surface of the valve main body.

According to a preferable embodiment, the first opening is formed in a side portion of the valve port, and the porous body is formed into a shape that the porous body is cut in a portion corresponding to the first opening.

According to a further preferable embodiment, the porous body is formed into a C-shaped cross section that the porous body is cut in a portion corresponding to the first opening over an elevating direction of the valve body.

According to the other preferable embodiment, a portion in an opposite side to the first opening protrudes toward the valve port side.

According to the other preferable embodiment, the porous body is formed into a wavy shape in a peripheral direction.

Effect of the Invention

According to the electrically operated valve of the present invention, the porous body is arranged along the portion which is positioned in the side portion of the valve port on the inner wall surface of the valve main body. As a result, it is possible to inhibit an eddy flow from being generated in the vicinity of an area between the valve port and the inner wall surface of the valve main body in the case that the fluid (the gas refrigerant) is flowed in the first flowing direction and the second flowing direction, it is possible to simplify the arrangement and construction of the porous body, and it is possible to suppress the flow rate loss of the fluid together with the arrangement of the porous body. Therefore, it is possible to effectively reduce the abnormal noise generated in the electrically operated valve while suppressing the flow rate loss of the fluid with the simple construction.

DETAILED DESCRIPTION OF PREFERRED EMBODIMENTS

A description will be given below of embodiments of an electrically operated valve according to the present invention with reference to the accompanying drawings.

Embodiment 1

Figure 1:
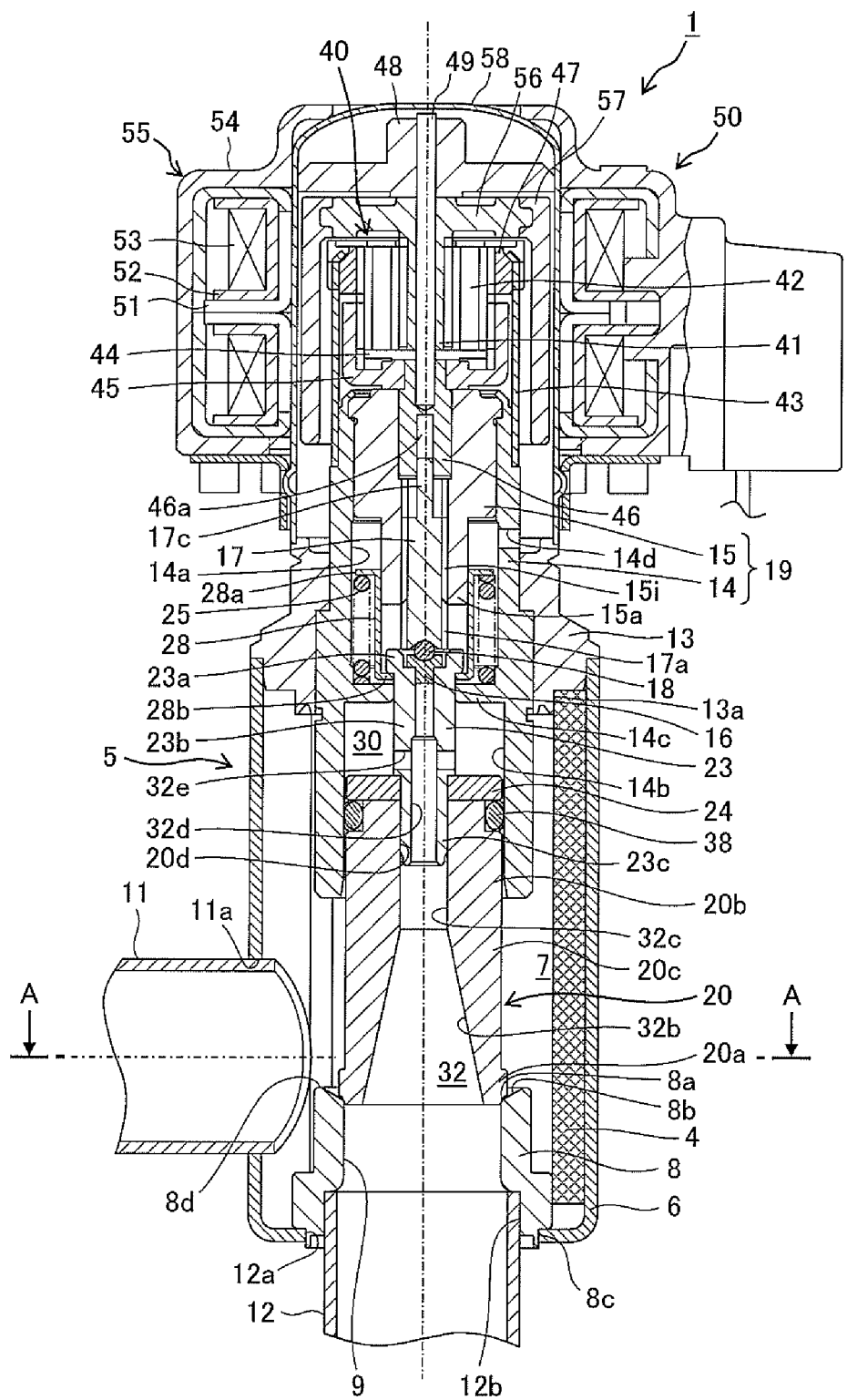
FIG. 1 is a vertical cross sectional view showing a valve close state of an embodiment 1 of an electrically operated valve according to the present invention.
Figure 2:
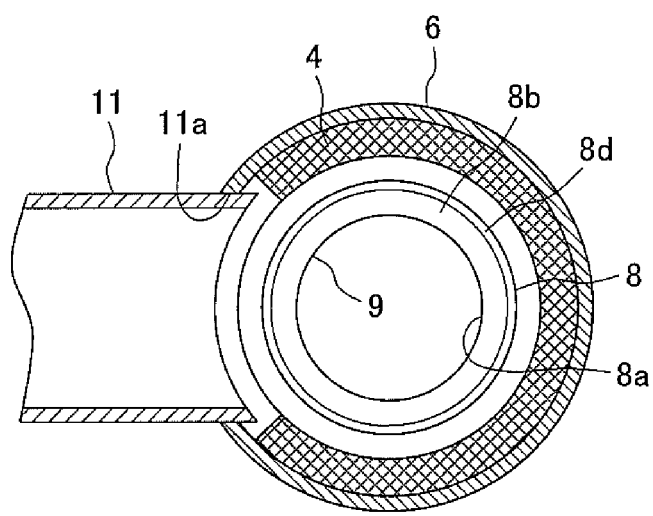
FIG. 2 is a cross sectional view as seen from an arrow A-A in FIG. 1.

FIG. 1 is a vertical cross sectional view of an embodiment 1 of an electrically operated valve according to the present invention, and FIG. 2 is a cross sectional view as seen from an arrow A-A in FIG. 1. FIG. 2 shows while omitting a valve body.

An illustrated electrically operated valve 1 is used as an expansion valve, for example, in a heat pump type heating and cooling system, and is a two-direction distribution type electrically operated valve corresponding to a flow path in which a fluid (a refrigerant) flows in two directions (a first flowing direction and an inverse second flowing direction), and a great flow rate flows at least in one direction.

The electrically operated valve 1 is mainly provided with a valve main body 5 which has a tubular base body 6 made of a sheet metal, a can 58 which is firmly fixed to the valve main body 5, a support member 19 which is arranged so as to be fixed to the valve main body 5 in an internal space defined by the valve main body 5 and the can 58, a valve body 20 which is supported by the support member 19 and is arranged in the internal space in an up-and-down movable manner, and a stepping motor (an elevation drive portion) 50 which is attached to the above of the valve main body 5 so as to move up and down the valve body 20.

In the tubular base body 6 of the valve main body 5, a valve chamber 7 is defined in an inner portion thereof, a transversely situated first opening 11a open to the valve chamber 7 is formed in a side portion thereof, and a vertically situated second opening 12a open to the valve chamber 7 is formed in a bottom portion thereof. A stepped valve seat member 8 is firmly fixed to the second opening 12a which is formed in the bottom portion of the tubular base body 6 in the valve main body 5, the stepped valve seat member 8 having a vertically situated valve port 9 and a valve seat 8a which are open to the valve chamber 7. Further, a transversely situated conduit coupling 11 is attached to the first opening 11a which is formed in the side portion of the tubular base body 6, and a vertically situated conduit coupling 12 is attached to a connection port 12b having a larger diameter than the valve port 9 which is formed in a bottom portion 8c side of the valve seat member 8, the vertically situated conduit coupling 12 being communicated with the valve port 9 of the valve seat member 8.

More specifically, in the stepped valve seat member 8, the bottom portion thereof is fitted to the second opening 12a so as to be firmly fixed to the tubular base body 6 of the valve main body 5, and the conduit coupling 12 is attached to the connection port 12b formed in the bottom portion 8c side by being fitted and inserted. Further, an inclined surface 8b connected to the valve seat 8a is formed in an upper end portion of the valve seat member 8, and the valve seat member 8 and the conduit coupling 11 are arranged in such a manner that the upper end portion 8d of the inclined surface 8b is positioned approximately in the vicinity of the center of the conduit coupling 11 attached to the first opening 11a or slightly below the center of the conduit coupling 11, and the valve seat 8a (the upper end portion of the valve port 9) is positioned lateral to the conduit coupling 11 attached to the first opening 11a A stepped tubular pedestal 13 is attached to an upward opening portion of the tubular base body 6 in the valve main body 5, the tubular pedestal 13 being reduced its diameter toward an upward direction. A lower end portion of a cylindrical can 58 having a ceiling portion is bonded to an upper end portion of the tubular pedestal 13 by welding. Further, the support member 19 has a tubular retention member 14 with partition wall 14c and a bearing member 15 with female thread 15i, the tubular retention member 14 is fixed to an inner side of the tubular pedestal 13 by press fitting, and a tubular female thread bearing member 15 is fixed to an upper portion of the tubular retention member 14 by caulking, the tubular female thread bearing member 15 being threadably provided with a female thread 15i below an inner peripheral surface. A protrusion portion 15a is formed in a center side of a lower surface of the female thread bearing member 15, and the female thread 15i is threadably provided in the protrusion portion 15a. Further, a spring chamber 14a is defined between the partition wall 14c of the tubular retention member 14 and the female thread bearing member 15, and a valve opening spring 25 is stored in the spring chamber 14a, the valve opening spring 25 energizing the valve body 20 in a valve opening direction.

Further, the valve body 20 is constructed by a tubular body in which a pressure equalizing passage 32 extending along an elevating direction (a vertical direction) of the valve body 20 is formed in a center portion thereof, and an upper portion of the valve body 20 is fitted and inserted slidably to a valve body guide hole 14b in a lower side than the partition wall 14c in the tubular retention member 14. The valve body 20 has an upper cylinder portion 20b in which an inner diameter is fixed, and a skirt portion 20c in which an inner diameter is continuously expanded toward the valve port 9 of the valve seat member 8, from the above. A center hole of the upper cylinder portion 20b is constructed as a fitting hole 20d to which a small-diameter lower portion 23c of a thrust transmission member 23 is fitted and fixed, and a lower end portion of the skirt portion 20c is constructed as a valve body portion 20a which comes close to and away from the valve seat 8a of the valve seat member 8 so as to open and close the valve port 9 and is formed approximately into a circular truncated cone. The inner diameter of the upper cylinder portion 20b is the same as the inner diameter of the upper end portion of the skirt portion 20c. Accordingly, an inner peripheral surface of the upper cylinder portion 20b is continuously connected to an inner peripheral surface of the skirt portion 20c.

Further, a porous body 4 is arranged in an inner wall surface of the tubular base body 6 of the valve main body 5, particularly in a portion which is positioned lateral to (in an outer side of) the valve port 9 of the valve seat member 8 in the inner wall surface so as to be closely attached along the inner wall surface, the porous body 4 serving as an eddy flow generation preventing means and being constructed by a foam metal. The porous body 4 has an approximately C-shaped transverse cross sectional surface in which a portion corresponding to the first opening 11a is notched over a whole in the elevating direction (the vertical direction) of the valve body 20, so as not to inhibit flow of fluid which circulates in the inner portion of the conduit coupling 11 attached to the first opening 11a and the valve chamber 7 (refer to FIG. 2). The porous body 4 is retained within the valve chamber 7 in such a manner that an upper end portion thereof is fitted to a concave fitting portion 13a which is provided in an outer peripheral side of a lower end portion of the tubular pedestal 13 so as to be firmly fixed by welding, a lower end portion thereof is inserted between an outer peripheral surface of the stepped valve seat member 8 and an inner wall surface of the tubular base body 6, an outer peripheral surface thereof is arranged by being brought into contact with the inner wall surface of the tubular base body 6, and an inner peripheral surface thereof is arranged by being brought into contact with the fitting portion 13a of the tubular pedestal 13 and the outer peripheral surface of the valve seat member 8.

The porous body 4 may be structured such that the upper end portion thereof is fixed and attached to the fitting portion 13a of the tubular pedestal 13, and the lower end portion thereof is fixed and attached to the valve seat member 8, for example, on the basis of an elastic force of the porous body 4. Further, the porous body 4 may be structured, for example, such that the lower end portion thereof is firmly fixed to the outer peripheral surface of the valve seat member 8 by welding so as to be retained within the valve chamber 7. Further, the porous body 4 may be structured, for example, such that the outer peripheral surface thereof is firmly fixed to the inner wall surface of the tubular base body 6 by welding so as to be retained within the valve chamber 7.

On the other hand, the stepping motor 50 has a stator 55 which is constructed by a yoke 51, a bobbin 52, a coil 53 and a resin mold cover 54, and a rotor 57 which is arranged in an inner portion of the can 58 so as to be rotatable in relation to the can 58, and in which a rotor support member 56 is firmly fixed to an upper inner side thereof. The stator 55 is outward fitted and fixed to the can 58. Further, an inner peripheral side of the rotor 57 is provided with a mechanical paradox planetary gear type speed reduction mechanism 40 constructed by a sun gear 41 which is integrally formed in the rotor support member 56, a fixed ring gear 47 which is fixed to an upper end of a tubular body 43 firmly fixed to an upper portion of the tubular retention member 14, a planetary gear 42 which is arranged between the sun gear 41 and the fixed ring gear 47 and engages with each of them, a carrier 44 which rotatably supports the planetary gear 42, a closed-end ring-shaped output gear 45 which engaged with the planetary gear 42 from an outer side, and an output shaft 46 which is firmly fixed its upper end to a hole formed in a bottom portion of the output gear 45 by press fitting. Here, a teeth number of the fixed ring gear 47 is set to be different from a teeth number of the output gear 45.

A hole is formed in a center portion in an upper portion of the output shaft 46, and a lower portion of a support shaft 49 passing through the sun gear 41 (the rotor support member 56) and the center portion of the carrier 44 is inserted to the hole. An upper portion of the support shaft 49 has an outer diameter which is approximately the same as an inner diameter of the can 58, and is inserted to a hole which is formed in a center portion of the support member 48 arranged in an upper side of the rotor support member 56 so as to come into inward contact with the can 58. The rotor 57 itself is structured such as to be immovable in the inner portion of the can 58 by the support member 48, and a positional relationship to the stator 55 outward fitted and fixed to the can 58 is maintained to be always constant.

A lower portion of the output shaft 46 of the speed reduction mechanism 40 is rotatably fitted and inserted to the upper portion of the tubular female thread bearing member 15 which constructs the support member 19 supporting the output shaft 46, and a slit-like fitting portion 46a extending in a lateral direction so as to pass through the center is formed in a lower portion of the output shaft 46. A plate-like portion 17c is provided in a protruding manner in an upper end of a rotary elevation shaft 17 which is threadably provided with a male thread 17a engaging with the female thread 15i threadably provided below an inner peripheral surface of the female thread bearing member 15, and the plate-like portion 17c is slidably fitted to the slit-like fitting portion 46a. In the case that the output shaft 46 rotates in correspondence to the rotation of the rotor 57, the rotation of the output shaft 46 is transmitted to the rotary elevation shaft 17, and the rotary elevation shaft 17 moves up and down while rotating on the basis of thread feeding of the female thread 15i of the bearing member 15 and the male thread 17a of the rotary elevation shaft 17.

The stepped tubular thrust transmission member 23 is arranged below the rotary elevation shaft 17, the thrust transmission member 23 to which the thrust applied to the below of the rotary elevation shaft 17 is transmitted via a ball 18 and a ball receiving seat 16. Since the ball 18 is interposed between the rotary elevation shaft 17 and the thrust transmission member 23, only the thrust applied to the below is transmitted to the thrust transmission member 23 from the rotary elevation shaft 17, for example, even in the case that the rotary elevation shaft 17 moves down while rotating. As a result, the turning force is not transmitted.

The thrust transmission member 23 is constructed by a large-diameter upper portion 23a in which the ball receiving seat 16 is fitted to an inner periphery, an intermediate body portion 23b which is slidably inserted to a hole formed in the partition wall 14c of the tubular retention member 14, and a small-diameter lower portion 23c which has a smaller diameter than the intermediate body portion 23b, from the above, and a vertically situated through hole 32d and a plurality of transverse holes 32e are formed in an inner portion thereof, the vertically situated through hole 32d constructing an upper portion of the pressure equalizing passage 32 formed within the valve body 20, and the transverse holes 32e being open to a back pressure chamber 30 mentioned later. An upper end opening of the through hole 32d is occluded by the ball receiving seat 16.

The small-diameter lower portion 23c of the thrust transmission member 23 is fitted and fixed by press fitting to the fitting hole 20d of the upper cylinder portion 20b in the valve body 20 as mentioned above, and the valve body 20 and the thrust transmission member 23 are integrally moved up and down. A presser member 24 is fixed by being pinched between an upper end surface of the valve body 20 and a lower end step portion of the intermediate body portion 23b in the thrust transmission member 23 at the press fitting time of the small-diameter lower portion 23c, and a seal member 38 such as an O-ring is installed among the presser member 24, an annular groove formed in an upper end portion of the valve body 20 and the valve body guide hole 14b.

Further, a valve opening spring 25 constructed by a compression coil spring is arranged in the spring chamber 14a which is in an upper side of the partition wall 14c of the tubular retention member 14 in a state in which a lower end of the valve opening spring 25 is brought into contact with the partition wall 14c, as mentioned above, and a pull-up spring receiving body 28 having upper and lower collar-like hook portions 28a and 28b is arranged in such a manner as to transmit an energizing force (a pull-up force) of the valve opening spring 25 to the valve body 20 via the thrust transmission member 23. The upper hook portion 28a of the pull-up spring receiving body 28 is mounted to an upper portion of the valve opening spring 25, and the lower hook portion 28b is retained to the lower end step portion of the large-diameter upper portion 23a in the thrust transmission member 23. Further, a communication hole 14d communicating the spring chamber 14a and the inner portion of the can 58 is formed in the tubular retention member 14.

Therefore, in the case that the rotor 57 of the motor 50 is rotationally driven in one direction, the rotation of the rotor 57 is transmitted in a speed reduction manner to the rotary elevation shaft 17 via the output shaft 46 of the speed reduction mechanism 40, the rotary elevation shaft 17 is moved down, for example, while rotating, on the basis of the thread feeding achieved by the female thread 15i of the female thread bearing member 15 and the male thread 17a of the rotary elevation shaft 17, the thrust transmission member 23 and the valve body 20 are pushed down against the energizing force of the valve opening spring 25 by the thrust of the rotary elevation shaft 17, and the valve body portion 20a constructed by the lower end portion of the skirt portion 20c in the valve body 20 finally seats on the valve seat 8a so as to close the valve port 9 (refer to FIG. 1). On the contrary, in the case that the rotor 57 of the motor 50 is rotationally driven in the other direction, the rotation of the rotor 57 is transmitted in a speed reduction manner to the rotary elevation shaft 17 via the output shaft 46 of the speed reduction mechanism 40, the rotary elevation shaft 17 is moved up, for example, while rotating on the basis of the thread feeding by the female thread 15i and the male thread 17a, the thrust transmission member 23 and the valve body 20 are accordingly pulled up by the energizing force of the valve opening spring 25, and the valve seat 8a is detached from the valve seat 8a so as to open the valve port 9.

Further, a back pressure chamber 30 is defined between the presser member 24 and the partition wall 14c of the tubular retention member 14 above the valve body 20. A pressure equalizing passage 32 is formed within the valve body 20 so as to communicate the lower end portion of the valve body 20 with the back pressure chamber 30, the pressure equalizing passage 32 having a thick passage portion 32b constructed by an inner peripheral surface of the skirt portion 20c in which a lower end is open toward the valve port 9, and a narrow passage portion 32c (the fitting hole 20d) constructed by an inner peripheral surface of the upper cylinder portion 20b. The narrow passage portion 32c is communicated with the back pressure chamber 30 via a through hole 32d and a transverse hole 32e of the thrust transmission member 23. Here, a chamber diameter of the back pressure chamber 30 is set to be approximately equal to a bore diameter of the valve port 9, in such a manner as to balance a push-down force acting on the valve body 20 in a valve closed state (a force acting in a valve closing direction) and a push-up force acting on the valve body 20 (a force acting in a valve opening direction) (cancel differential pressure).

In the electrically operated valve 1 according to the present embodiment 1, in the case that the valve port 9 is opened by rotationally driving the rotor 57 of the motor 50 in the other direction, the fluid (the refrigerant) is flowed in two directions including a first flowing direction (a flowing direction from the conduit coupling 11 connected to the first opening 11a toward the conduit coupling 12 connected to the valve seat member 8 of the second opening 12a) and a second flowing direction which is opposite to the first flowing direction. However, in the case that the refrigerant constructed by the gas (the gas refrigerant) is flowed in the first flowing direction and the second flowing direction in a state in which the gas is excessive (an excessive gas state), periodicity of the eddy flow is lost by the porous body 4 which is provided along a portion positioned lateral to the side part of the valve port 9 in the valve seat member 8 among the inner wall surface of the valve main body 5, the eddy flow being generated in an area between the valve port 9 and the inner wall surface of the valve main body 5 (particularly in an area between right and left portions of the valve port 9 and the inner wall surface of the valve main body 5 when viewing the valve chamber 7 from the first opening 11a side in the case that the refrigerant is flowed in the first flowing direction, and an area between the opposite side portion to the first opening 11a of the valve port 9 and the inner wall surface of the valve main body 5 in the case that the fluid is flowed in the second flowing direction), and the generation of the eddy flow is inhibited in the area. Therefore, it is possible to effectively reduce the abnormal noise which is generated in the electrically operated valve 1.

Figure 8:
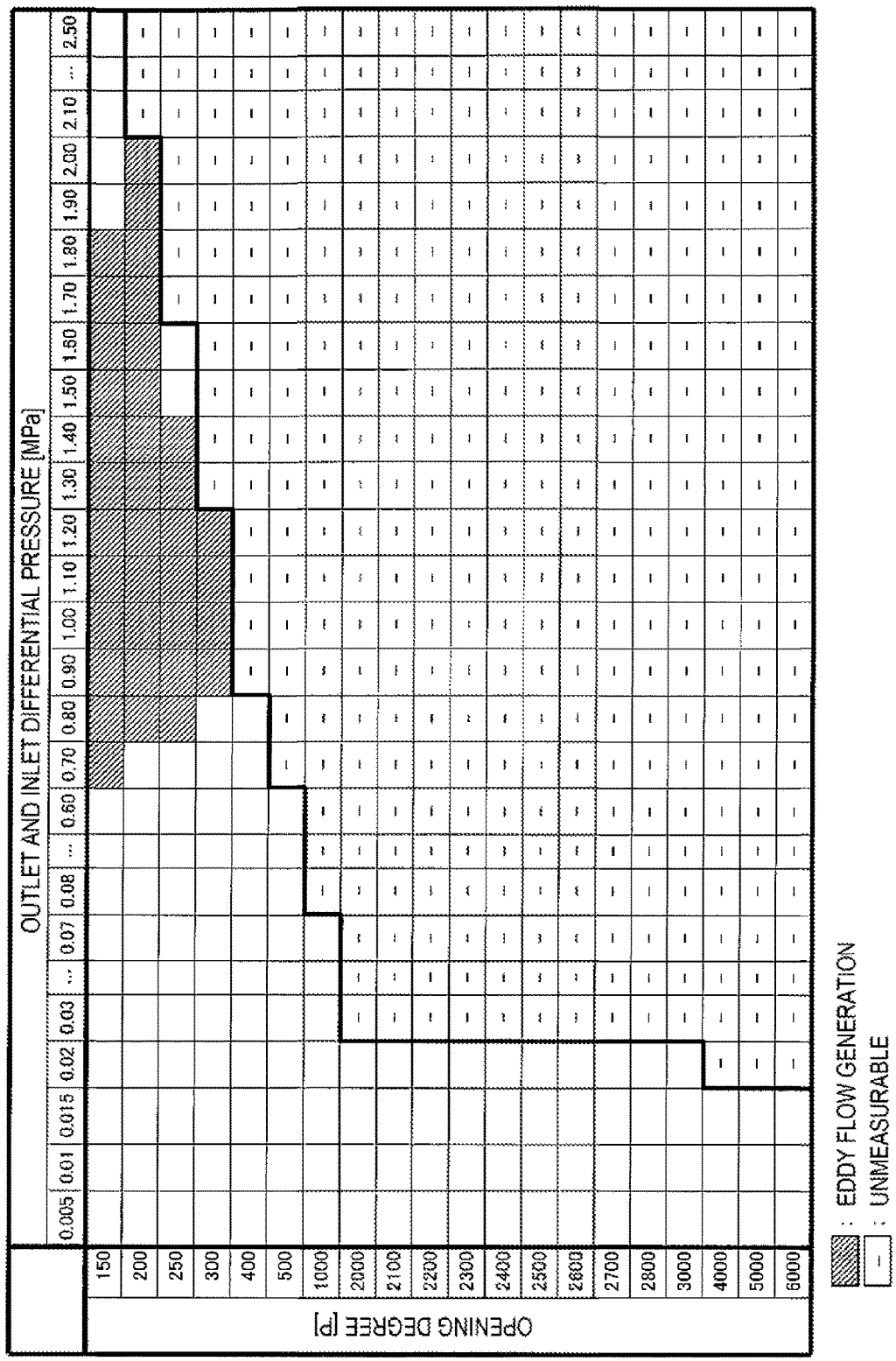
FIG. 8 is a view showing a result of experiment obtained by measuring whether or not the eddy flow is generated at the valve opening time of the electrically operated valve having the conventional structure.

Specifically, it has been confirmed by the experiments executed by the inventors of the present invention that the eddy flow (refer to FIG. 8) generated in the electrically operated valve having the conventional structure securely disappears in the case of changing an amount of exciting pulse applied to the stepping motor 50 of the electrically operated valve 1 from 150 pulses to 300 pulses under a condition that the differential pressure between the conduit coupling 11 side and the conduit coupling 12 side is high (about 0.7 to 2.0 MPa), in the case that the gas refrigerant is flowed in the first flowing direction in the state in which the gas is excessive (the excessive gas state).

Further, in the electrically operated valve 1 according to the present embodiment 1, since the porous body 4 is arranged so as to be closely attached along the inner wall surface of the tubular base body 6 in the valve main body 5, it is possible to simplify the arrangement and the construction of the porous body 4.

Further, in the electrically operated valve 1 according to the present embodiment 1, the porous body 4 mentioned above is arranged on the inner wall surface along the inner wall surface of the tubular base body 6 in the valve main body 5, and has the approximately C-shaped transverse cross section in which the portion corresponding to the first opening 11a is notched over a whole in the elevating direction of the valve body 20. Therefore, it is possible to securely suppress the flow rate loss of the fluid which circulates in the inner portion of the conduit coupling 11 attached to the first opening 11a and the valve chamber 7.

Figure 3:
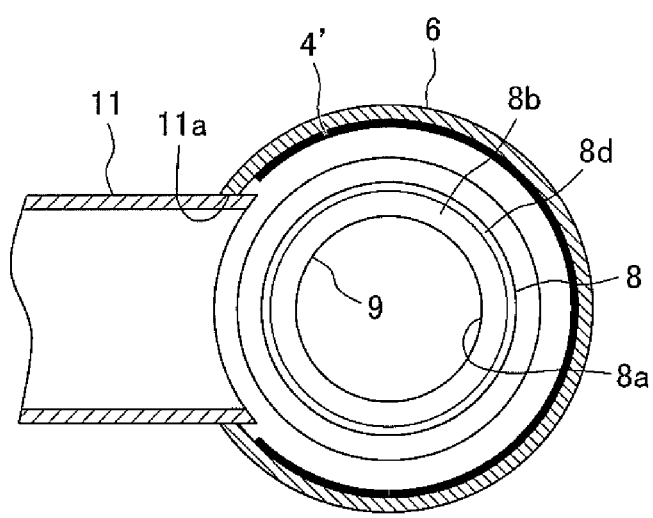
FIG. 3 is a transverse cross sectional view showing the other example of the electrically operated valve shown in FIG. 2.

In the embodiment 1 mentioned above, the foam metal is employed as the porous body 4 serving as the eddy flow generation preventing means, however, it is possible to employ, for example, a mesh member obtained by weaving a metal wire rod like mesh, a laminated body obtained by laminating a plurality of the mesh members, a punching metal constructed by a metal plate (a plate-like member) in which a plurality of openings are formed, and a metal plate (a plate-like member) in which a plurality of openings are formed by a photo-etching method (refer to FIG. 3), in place of the foam metal, and it is possible to use combination thereof. Further, the porous body 4 may be of course formed, for example, by ceramics or resins, in addition to the metal.

Further, the embodiment 1 mentioned above employs the aspect that the valve body 20 has the skirt portion 20c which is expanded its inner diameter toward the valve port 9 of the valve seat member 8, however, the inner shape of the valve body 20 can be appropriately changed, for example, the valve body 20 may have a fixed inner diameter over a vertical direction.

Embodiment 2

Figure 4:
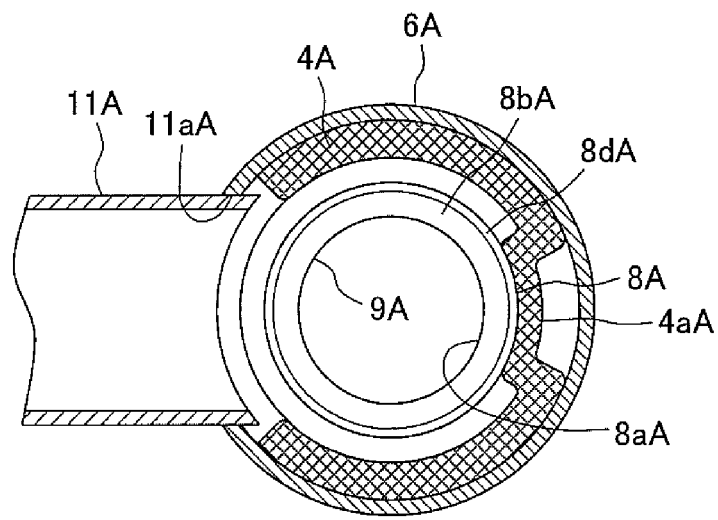
FIG. 4 is a transverse cross sectional view showing an embodiment 2 of the electrically operated valve according to the present invention.

FIG. 4 is a transverse cross sectional view showing an embodiment 2 of the electrically operated valve according to the present invention. The electrically operated valve according to the present embodiment 2 is different from the electrically operated valve according to the embodiment 1 mentioned above in a shape of the porous body constructed by the foam metal, however, is approximately the same as the electrically operated valve according to the embodiment 1 in the other structures. Therefore, a detailed description of the same structures of the electrically operated valve according to the embodiment 1 will be omitted by attaching the same reference numerals to the same structures.

It has been confirmed by the experiments of the inventors of the present invention that the periodic eddy flow mentioned above is generated in the area near the valve port 9A, in the are between the portion in the opposite side to the first opening 11aA of the valve port 9A and the inner wall surface of the valve main body 5A, in the case that the gas refrigerant is flowed in the second flowing direction in the state in which the gas is excessive (the excessive gas state).

In the electrically operated valve according to the present embodiment 2, the portion in the opposite side to the first opening 11aA of the porous body 4A protrudes toward the valve port 9A side (the inner side), and the inner peripheral surface of the protruding portion (the opposite portion to the first opening 11aA) 4a is arranged so as to come into contact with the outer peripheral surface of the upper portion of the stepped valve seat member 8A. A width in a peripheral direction of the protruding portion 4aA of the porous body 4A can be appropriately set, for example, while taking into consideration a rigidity of the porous body 4A and a magnitude of the vortex.

Therefore, in the electrically operated valve according to the present embodiment 2, the generation of the eddy flow is suppressed in the area between the valve port 9 and the inner wall surface of the valve main body 5 (particularly, in the area between the right and left portions of the valve port 9 and the inner wall surface of the valve main body 5 when viewing the valve chamber 7 from the first opening 11a side) by the porous body 4A in the case that the gas refrigerant is flowed in the first flowing direction in the state in which the gas is excessive (the excessive gas state), in the same manner as the embodiment 1 mentioned above, and the generation of the eddy flow is further suppressed in the area between the valve port 9 and the inner wall surface of the valve main body 5 (particularly in the area between the portion in the opposite side to the first opening 11a of the valve port 9 and the inner wall surface of the valve main body 5) by the protruding portion 4aA in the porous body 4A in the case that the gas refrigerant is flowed in the second flowing direction in the state in which the gas is excessive (the excessive gas state). Therefore, it is possible to more effectively reduce the abnormal noise which is generated in the electrically operated valve 1.

Figure 5:
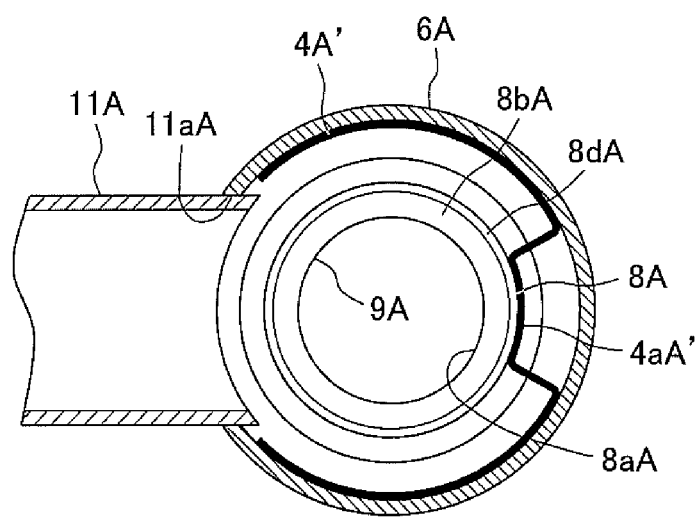
FIG. 5 is a transverse cross sectional view showing the other example of the electrically operated valve shown in FIG. 4.

In the embodiment 2 mentioned above, it goes without saying that it is possible to employ, for example, the mesh member obtained by weaving the metal wire rod like mesh, the laminated body obtained by laminating a plurality of the mesh members, the punching metal constructed by the metal plate (the plate-like member) in which a plurality of openings are formed, and the metal plate (the plate-like member) in which a plurality of openings are formed by the photo-etching method (refer to FIG. 5), as the porous body 4A serving as the eddy flow generation preventing means, in place of the foam metal, and it is possible to use combination thereof, in the same manner as the embodiment 1 mentioned above. Further, the porous body 4 may be of course formed, for example, by the ceramics or the resins, in addition to the metal.

Figure 6:
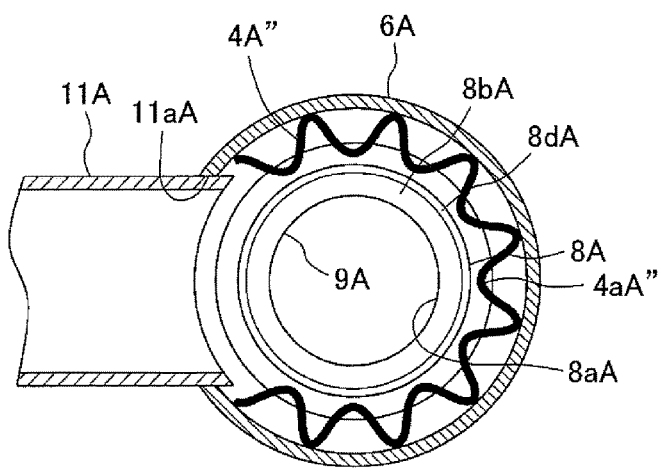
FIG. 6 is a transverse cross sectional view showing further the other example of the electrically operated valve shown in FIG. 4.
Figure 7:
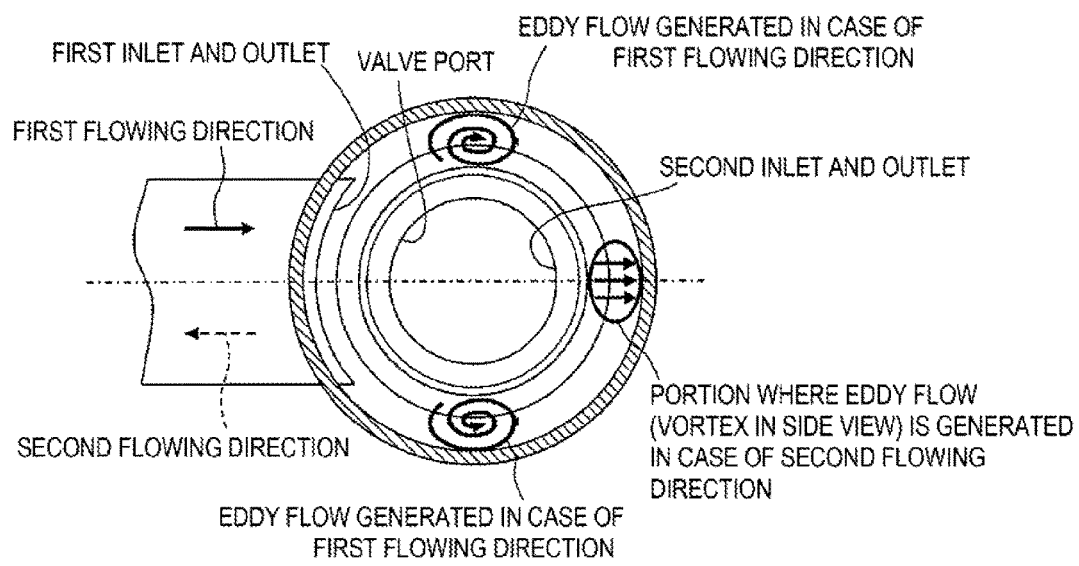
FIG. 7 is a view showing a portion where an eddy flow is generated at the valve opening time of an electrically operated valve having a conventional structure.

Further, in order to simplify a manufacturing process of the porous body 4A and an assembling process of the electrically operated valve 1, a porous body 4A" may be formed into a wavy shape in a peripheral direction and the porous body 4A" may be arranged along an inner wall surface of a tubular base body 6A of the valve main body 5A so that a top portion of the wavy shape comes into contact with the inner wall surface of the tubular base body 6A, as shown in FIG. 6. An amplitude (corresponding to a protruding amount to the valve port 9A side (an inner side)) and a period (corresponding to a distance in a peripheral direction) of the wavy porous body 4A" can be appropriately set, for example, by taking into consideration a manufacturing process of the porous body 4A" and a magnitude of the vortex. In this case, the portion in the opposite side to the first opening 11aA in the porous body 4A" protrudes toward the valve port 9A side (the inner side), and the portion in the opposite side to the first opening 11aA of the porous body 4A" is arranged near the valve port 9A. As a result, in the case that the gas refrigerant is flowed in the second flowing direction in the state in which the gas is excessive (the excessive gas state), the generation of the eddy flow is further suppressed by the porous body 4A" in the area between the valve port 9 and the inner wall surface of the valve main body 5 (particularly in the area between the portion in the opposite side to the first opening 11a of the valve port 9 and the inner wall surface of the valve main body 5).

In the description mentioned above, the electrically operated valves according to the present embodiments 1 and 2 are set to the two-direction distribution type electrically operated valve which is used as the expansion valve, for example, in the heat pump type heating and cooling system, and in which the fluid flows in two directions, however, it goes without saying that the electrically operated valve according to the present invention can be applied to the other systems than the heat pump type heating and cooling system, and it is of course possible to be applied to an electrically operated valve in which the fluid flows only in one direction.

What is claimed is:

1. An electrically operated valve comprising:
   a valve main body with a tubular base body in which a valve chamber is defined in an inner portion and a first opening and a second opening are formed in a side portion and a bottom portion, respectively;
   a valve seat member which has a valve port open to said valve chamber and a valve seat and is provided in said second opening of said valve main body;
   an axially symmetric valve body which is arranged in said valve chamber so as to be movable up and down; and
   an elevation drive portion which moves up and down said valve body in relation to said valve seat,
   wherein a porous body is arranged along a portion which is positioned in a side portion of said valve port along an inner wall surface of said valve main body, and
   wherein said porous body is formed into a C-shaped cross section arranged coaxially to the tubular base body of the valve main body and to the valve body, wherein the porous body is cut out in a portion between ends of the C-shaped cross section to form an opening between the ends of the C-shaped cross section in a way such that a fluid is able to pass through the opening so as to not inhibit flow of the fluid between said side portion and the valve port, and
   wherein the opening of the porous body faces said first opening over a whole in an elevating direction of said valve body to provide said C-shaped cross section defined by a section plane orthogonal to the elevating direction of the valve body.

2. The electrically operated valve according to claim 1, wherein a portion in an opposite side to said first opening protrudes toward said valve port side.

3. The electrically operated valve according to claim 1, wherein said porous body is formed into a wavy shape in a peripheral direction.

4. The electrically operated valve according to claim 1, wherein said porous body is constructed by at least one of a foam member, a mesh member obtained by weaving a wire rod like mesh, a laminated body obtained by laminating a plurality of said mesh members, and a plate-like member in which a plurality of openings are formed.

5. The electrically operated valve according to claim 1, wherein an upper portion of said porous body is fitted to a concave fitting portion of the tubular base body and a lower end portion is inserted between an outer peripheral surface of the valve seat member and an inner wall surface of the tubular base body.

6. The electrically operated valve according to claim 1, wherein the electrically operated valve is configured as a two-direction distribution electrically operated valve having a flow path in which a fluid is able to flow in two directions.

7. An electrically operated valve comprising:
   a valve main body with a tubular base body in which a valve chamber is defined in an inner portion and a first opening and a second opening are formed in a side portion and a bottom portion, respectively;
   a valve seat member which has a valve port open to said valve chamber and a valve seat and is provided in said second opening of said valve main body;

an axially symmetric valve body which is arranged in said valve chamber so as to be movable up and down; and an elevation drive portion which moves up and down said valve body in relation to said valve seat, wherein a porous body is arranged along a portion which is positioned in a side portion of said valve port along an inner wall surface of said valve main body, and wherein said porous body is formed into a C-shaped cross section arranged coaxially to the tubular base body of the valve main body and to the valve body, wherein a space is cut out in a portion of the porous body between ends of the C-shaped cross section to form an opening through which a fluid passes in a way such that the opening does not inhibit flow of the fluid between said side portion and the valve port, and wherein the space of the porous body faces said first opening over a whole in an elevating direction of said valve body to provide said C-shaped cross section defined by a section plane orthogonal to the elevating direction of the valve body.

* * * * *